No. 837,232. PATENTED NOV. 27, 1906.
R. A. KREINER.
MILK STRAINER.
APPLICATION FILED MAY 18, 1906.
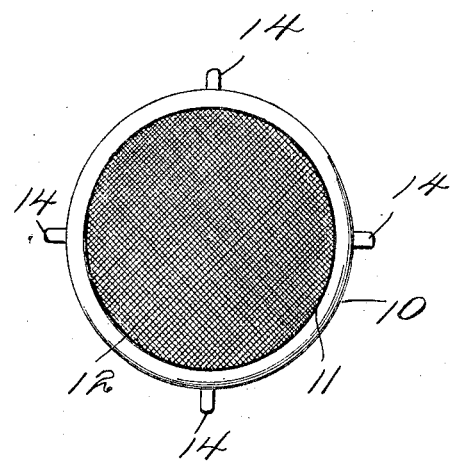
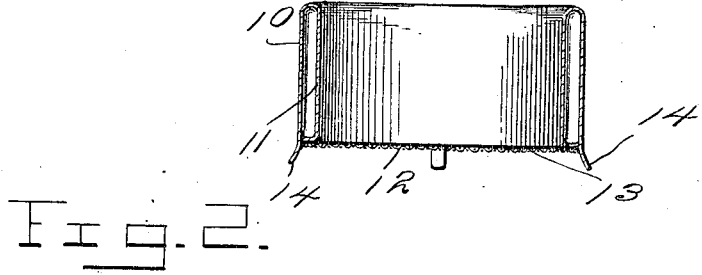
Witnesses
Inventor
Robert A. Kreiner
By
Attorneys

UNITED STATES PATENT OFFICE.

ROBERT A. KREINER, OF BURNSIDE, MICHIGAN.

MILK-STRAINER.

No. 837,232.  Specification of Letters Patent.  Patented Nov. 27, 1906.

Application filed May 18, 1906. Serial No. 317,644.

*To all whom it may concern:*

Be it known that I, ROBERT A. KREINER, a citizen of the United States, residing at Burnside, in the county of Lapeer, State of Michigan, have invented certain new and useful Improvements in Milk-Strainers; and I do hereby declare the following to be a full, clear, and exact description of the invention, such as will enable others skilled in the art to which it appertains to make and use the same.

This invention has relation to floating milk-strainers, and has for its object the provision of improvements that will render the strainer more durable and simpler in construction than heretofore, so that it may be more easily handled and cleansed than heretofore, while it affords no obstruction to pouring milk into the separator-pan through the strainer than would exist if the latter were not present.

The nature of the invention embodies a hollow liquid-tight rim having a rounded inwardly-inclined top, vertical sides, and a flat bottom, to which latter the margin of the annular woven-wire strainer or sieve is secured, with supports connected to the sides to keep the strainer proper from coming into contact with the bottom of the pan or other vessel in beginning its use therein.

I will first describe the invention *in extenso* in view of the annexed drawings, forming a part of this specification, and then point out the part or improvement with distinctness and particularity in the subjoined claim.

Of the said drawings, Figure 1 is a top plan view of my improved milk-strainer. Fig. 2 is a vertical central sectional view thereof.

Similar figures of reference designate similar parts or features, as the case may be, wherever they occur.

In the drawings, 10 designates the outside, and 11 the inside, of a hollow liquid-tight rim suited with respect to its size and other structural characteristics to be placed in a separator pan or can for the transportation of milk. The rim may be made from a single sheet of heavy tin or other sheet metal bent into rounded form along the top and having, say, its inner wall 11 extended down vertically as far as needed to form the side of the rim and then turned at a right angle outward to meet the outside wall 10, to which it may be secured by soldering or in any other suitable way, or the outer wall 10 may be turned inward at its lower end to form the bottom to the rim, and, again, both walls may have their bottoms turned toward each other and overlap, the margin of the strainer-bottom 12 secured between them. At any rate a broad and ample surface is afforded by the bottom 13 of the hollow rim to secure the margin of the wire-woven bottom thereto with security equal to the strength of a component part of the strainer itself.

As before intimated, the upper edge of the hollow rim is rounded and inclines inwardly, so that milk can be as readily poured into the strainer as into the pan without danger of any running over outside.

14 designates legs or supports attached at their upper ends to the outside walls of the rim and having a length sufficient to keep the bottom of the strainer off the pan or other vessel into which it may be placed.

The strainer can be placed in a separator-pan and the milk poured into it until the pan is full, and as it will not sink it only remains in the pan, if desired, until the milking and skimming are done.

The contrivance is exceedingly simple in construction and hence may be readily handled and kept clean.

By providing the device with legs, as described, the strainer proper is maintained above the bottom of the support for the legs, and by making the strainer flat in form its entire area within the inner wall is made available in use.

What is claimed as the invention is—

A floating milk-strainer comprising in its construction a hollow liquid-tight rim having its upper edge rounded with vertical sides, and having the margin of a strainer secured to the bottom of the rim, and divers legs connected with the bottom of the outer wall of the latter whereby the entire area of the strainer within the inner wall is made available.

In testimony whereof I affix my signature in presence of two witnesses.

ROBERT A. KREINER.

Witnesses:
 DAVID BLACK,
 JOHN BRUCE.